Nov. 1, 1932.   S. B. STAFFORD ET AL   1,885,872
DOCTOR VIBRATOR
Filed Feb. 17, 1931
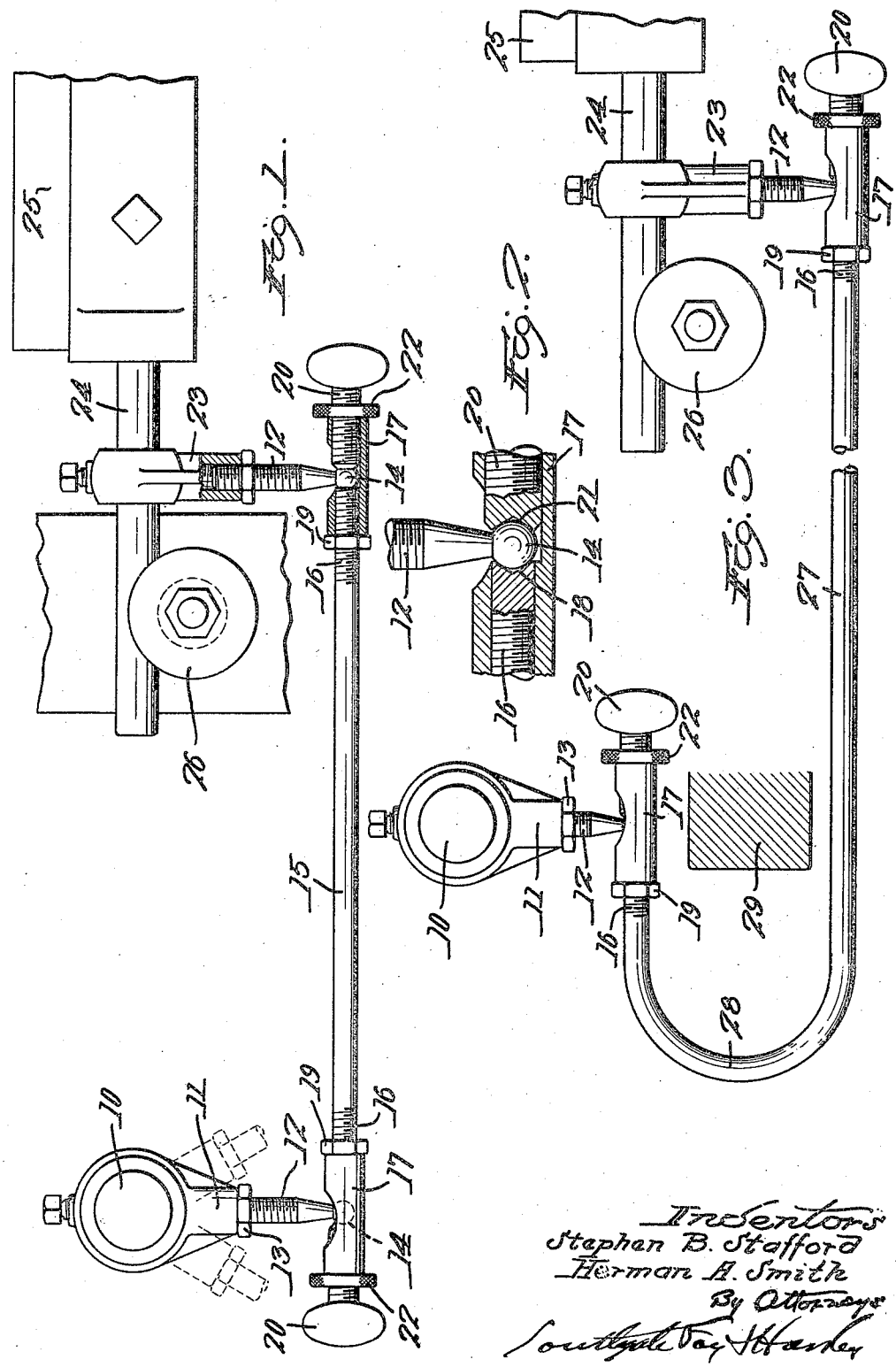
Inventors
Stephen B. Stafford
Herman A. Smith
By Attorneys Patented Nov. 1, 1932

1,885,872

UNITED STATES PATENT OFFICE

STEPHEN B. STAFFORD, OF OXFORD, AND HERMAN A. SMITH, OF WORCESTER, MASSACHUSETTS, ASSIGNORS TO RICE, BARTON & FALES, INCORPORATED, OF WORCESTER, MASSACHUSETTS, A CORPORATION OF MASSACHUSETTS

DOCTOR VIBRATOR

Application filed February 17, 1931. Serial No. 516,375.

This invention relates to a device for vibrating doctors used in connection with intaglio color cylinders for fabric color printing machines.

The principal objects of this invention are to provide a perfectly operating means for transmitting an oscillatory motion of a driving shaft into a longitudinal reciprocating motion of the doctor; to provide simple and effective means connected therewith for adjusting the points at which the power is applied and transmitted so that after wear these points can be changed to compensate for the wear and to provide a device which is adjustable in every desirable way.

Other objects and advantages of the invention will appear hereinafter.

Reference is to be had to the accompanying drawing, in which

Fig. 1 is a side view of a doctor blade and means for vibrating it, showing a preferred form of this invention;

Fig. 2 is an enlarged longitudinal sectional view of one of the joints, and

Fig. 3 is a view similar to Fig. 1 showing a modification which has to be used for doctors located in a certain position.

These doctor blades have been vibrated heretofore to get the same motion as is obtained in this case but whenever the surfaces through which the turning motion is transmitted become worn, there has been no way to take them up and adjust them to compensate for the wear and the motion has been rigid whereas it should be flexible. This invention is designed to avoid these difficulties.

Power is transmitted from a shaft 10 which is arranged to oscillate as indicated by the dotted lines in Fig. 1. On this shaft is positively fixed an arm 11 which is provided with a screw-threaded end 12 and check nut 13 for adjustment of the length of this arm. At the end the arm is provided with a spherical surface 14 to accommodate the motion required and allow for any adjustment.

This arm transmits a motion of reciprocation to a rod 15 that extends toward the doctor. This rod is provided at each end with a screw-thread 16 and on each of these screws is a sleeve 17. On each screw-threaded end is a concave surface 18, in each case shown as an internal cone, for fitting against the spherical surface 14. The sleeve is adjustable on the screw-thread and a check nut 19 is used to hold the sleeve in adjusted position. This sleeve is also provided with an internal screw-thread on its outer end which projects beyond the rod 15 and a thumb screw 20 screws into it. This thumb screw has a concave surface 21 for the same purpose as the surface 18 and is secured in position by a check nut 22.

The two screws 16 and 20 are screw-threaded into the sleeve 17. When it is desired to make an adjustment, the screws 20 at both ends of the rod 16 are loosened enough to free the two heads 14 which are taken out. Now the check nuts 19 can be loosened and the two screws 17 adjusted along the rod 15 as much as may be desired. Then the rod is applied so that the two heads 14 are in the respective heads 18 and then the screws 20 are screwed up to hold the adjustment and the nuts 22 tightened. The same adjustment of course can be made on the form shown in Fig. 3.

This description applies to both ends of the rod 15 and it will be seen that the two spherical surfaces 14 are held in the same way as a flexible joint and that the sleeve 17 and screw 20 are both adjustable so that after wear the center of the surface 14 can be brought back to its original position by this compound adjustment.

The spherical surface 14 at the right hand end of the rod 15 is on an end 12 like the one previously described and this is mounted on an arm 23 fixed to a shaft 24 which is the shaft on which the doctor blade 25 is mounted at one end. A roller support 26 is provided for carrying this shaft at this end and it is carried in a similar way at the other end.

In the form shown in Fig. 3 everything described above is present except that the rod 27 is provided with a bend 28 to accommodate it to a different position of the doctor blade. This is necessary in order to get around a projection 29 on the frame of the machine. The other elements of this form are numbered the same as in Fig. 1 because they are the same.

By this construction not only are the joints flexible so that there is no binding of the parts during operation, whether the device is new or worn, but also the two spherical surfaces 14 can be adjusted toward and from their supports and also they can be adjusted in a direction along the axis of the rod 15 by the turning of the rod 15 and the screw 20. Of course they can always be brought back to proper central position after wear.

Although we have illustrated and described only two forms of the invention we are aware of the fact that other modifications can be made therein by any person skilled in the art without departing from the scope of the invention as expressed in the claims. Therefore we do not wish to be limited in this respect but what we do claim is:—

1. In a device for vibrating a doctor blade, the combination with an oscillatory shaft, of an arm projecting therefrom, a rod having means for pivotally connecting said arm with it, and an arm fixed on the shaft of the doctor blade and pivotally connected with said rod for transmitting motion of the rod to the doctor blade.

2. In a device for vibrating a doctor blade of a color printing machine, the combination with an oscillatory shaft, of an arm projecting radially therefrom, a rod at right angles to said arm having means for pivotally connecting said arm with it, and an arm fixed on the shaft of the doctor blade and pivotally connected with said rod for transmitting motion of the rod to the doctor blade.

3. In a device for reciprocating a doctor blade, the combination with the doctor blade and its shaft, of means for supporting the shaft to reciprocate longitudinally, an operating shaft mounted to oscillate, an arm fixed to the oscillating shaft, an arm fixed to the doctor blade shaft, each of said arms having a spherical surface at the end, and a rod for transmitting reciprocation from one arm to the other having a pair of sockets for receiving said spherical surfaces.

4. In a device for reciprocating a doctor blade of a color printing machine, the combination with the doctor blade and its shaft, of means for supporting the shaft to reciprocate longitudinally, an operating shaft mounted to oscillate, an arm fixed to the oscillating shaft, an arm fixed to the doctor blade shaft, each of said arms having a spherical surface at the end adjustably connected with the arm, a rod for transmitting reciprocation from one arm to the other having a pair of sockets for receiving said spherical surfaces, and means for adjusting the position of said sockets along said rod.

5. In a device for reciprocating a doctor blade of a color printing machine, the combination with the doctor blade, its shaft, and means for supporting the shaft to vibrate in an axial direction, of an oscillatory shaft having its axis perpendicular to the shaft of the doctor blade, an arm fixed to each of said shafts, each arm having a screw-threaded end connected therewith for adjustment and a spherical surface on said end, a rod for transmitting the oscillation of the second shaft to the first shaft as a reciprocation, said rod being screw-threaded at each end and having a sleeve adjustably mounted on each screw-thread and provided with a concave surface for receiving the spherical surfaces, and a screw held in the outer end of each of said sleeves adjustably, said screws having concave surfaces for receiving the opposite sides of the two spherical surfaces and being adjustable for the purpose of taking up wear.

In testimony whereof we have hereunto affixed our signatures.

STEPHEN B. STAFFORD.
HERMAN A. SMITH.